US005631798A

United States Patent [19]

Seymour et al.

[11] Patent Number: 5,631,798

[45] Date of Patent: May 20, 1997

[54] MODULAR ACCESSORY MECHANICAL LOCK-OUT MECHANISM

[75] Inventors: Raymond K. Seymour, Plainville; Roger N. Castonguay, Terryville, both of Conn.

[73] Assignee: General Electric Company, New York, N.Y.

[21] Appl. No.: 614,084

[22] Filed: Mar. 12, 1996

Related U.S. Application Data

[63] Continuation-in-part of Ser. No. 266,399, Jun. 27, 1994, abandoned.

[51] Int. Cl.[6] .................... H02H 3/00

[52] U.S. Cl. .................... 361/102; 361/72; 335/34

[58] Field of Search .................... 361/72, 102, 93; 335/17-18, 20, 21, 27, 34; 200/400

[56] References Cited

U.S. PATENT DOCUMENTS

| | | | |
|---|---|---|---|
| 4,001,739 | 1/1977 | Powell et al. | 335/18 |
| 4,301,434 | 11/1981 | Castonguay | 335/20 |
| 4,672,501 | 6/1987 | Bilal et al. | 361/96 |

OTHER PUBLICATIONS

Castonguay et al, "Operating Mechanism for High Ampere-rated Circuit"; U.S. S/N: 08/202,140 (Docket: 41PR-7116).

Castonguay et al, "Handle Operator Assembly for High Ampere-rated Circuit Breaker" U.S. S/N: 08/214,522 (Docket: 41PR-7130).

Castonguay et al, "A Latching Arrangement for High-rated Circuit Breaker Operating Springs"; U.S. S/N: 08/218,287 (Docket:41PR-7131).

Castonguay et al, "Rating Module Unit for HIgh Ampere-rated Circuit Breaker" U.S. S/N: 08/203,062 (Docket:41PR-7124).

Castonguay et al, "Accessory Compartment for High Ampere-rated Circuit Breaker" U.S. S/N: 08/248,900 (Docket: 41PR-7143).

Pollman et al, "Bell Alarm and Lockout for High Ampere-rated Circuit Breakers" U.S. S/N: 08/248,910 (Docket: 41PR-7179).

Castonguay et al, "Sequential Interlock Arrangement for a High Ampere-rated Circuit" U.S. S/N: (Docket:41PR-7138X).

*Primary Examiner*—Jeffrey A. Gaffin
*Assistant Examiner*—Michael J. Sherry
*Attorney, Agent, or Firm*—Richard A. Menelly

[57] ABSTRACT

A combined bell alarm and lock-out accessory is connected with the electronic trip unit that controls a high ampere rated circuit breaker. The accessory interacts with the circuit breaker operating mechanism to activate the bell alarm upon circuit interruption and to prevent the closing of the circuit breaker contacts until the accessory is manually reset. The circuit breaker lock-out mechanism interfaces between the circuit breaker operating mechanism and the accessory to insure that the contacts remain open until the accessory is completely reset.

7 Claims, 3 Drawing Sheets

MODULAR ACCESSORY MECHANICAL LOCK-OUT MECHANISM

This is a Continuation-in-Part application of U.S. patent application Ser. No. 08/266,399 filed Jun. 27, 1994, now abandoned.

BACKGROUND OF THE INVENTION

U.S. Pat. No. 5,488,211 entitled "A Latching Arrangement for High Ampere-rated Circuit Breaker Operating Springs" describes a combined bell alarm and lock-out accessory that is connected with the electronic trip unit that controls a high ampere rated circuit breaker. The accessory interacts with the circuit breaker operating mechanism to activate the bell alarm upon circuit interruption and to prevent the closing of the circuit breaker contacts until the accessory is manually reset. U.S. patent application Ser. No. 08/248,900 filed May 25, 1994 entitled "Accessory Compartment for High Ampere-rated Circuit Breaker" relates to a high ampere-rated circuit breaker that meets the electrical code requirements of the world market. The circuit breaker electronic trip unit is contained within a recess in the circuit breaker cover and is interlocked with the circuit breaker operating mechanism to articulate the operating mechanism upon removal. The accessory units are contained within an adjoining accessory compartment recess within the circuit breaker cover.

U.S. patent application Ser. No. 08/248910 filed May 25, 1994 "Bell Alarm and Lock-out for High Ampere-rated Circuit Breakers" describes a combined bell alarm and lock-out accessory that is connected with the electronic trip unit that controls a high ampere rated circuit breaker. The accessory interacts with the circuit breaker operating mechanism to activate the bell alarm upon circuit interruption and to prevent the closing of the circuit breaker contacts until the accessory is manually reset.

U.S. patent application Ser. No. 08/266,409 filed Jun. 27, 1994 entitled "Interlock Arrangement for High Ampere-rated Circuit Breaker Operating Springs" relates to a high ampere-rated circuit breaker which meets the electrical code requirements of the world market.

The charging of the powerful operating springs controlling the circuit breaker contacts is made manually by means of a ratchet and pawl assembly. A two stage latching arrangement controls the retention and release of the pawl to retain and discharge the operating springs. The latches are interlocked with the operating springs drive shaft to prevent the discharge of the operating springs when the contacts are in the closed condition.

When such accessories as described above are used within industrial applications, and have to be reset to insure future operation, it is desirable to insure that the associated circuit breaker contact closing springs are capable of being immediately reset. However, it is important that the circuit breaker contacts are not closed to turn on the circuit breaker unless and until the accessory has become reset and operational.

An early use of accessories within high ampere-rated circuit breakers is described within U.S. Pat. No. 4,001,739 entitled "Circuit Breaker with Bell Alarm and Breaker Lockout Accessory." The circuit breaker contacts are interlocked with the accessories by insuring that the circuit breaker contact springs cannot be reset until the associated accessory is reset, i.e. becomes operational.

The present invention improves over the early lockout accessory arrangement by allowing the circuit breaker operating mechanism to be reset independently from the accessory while still deterring closing of the circuit breaker contacts until and unless the accessory itself has become operational.

One purpose of the instant invention is to describe a circuit breaker lock-out mechanism that interacts with the circuit breaker operating mechanism to disable the circuit breaker operating mechanism to prevent the circuit breaker contacts from being closed until and unless the associated accessory becomes reset.

SUMMARY OF THE INVENTION

A circuit breaker lock-out mechanism interfaces between the circuit breaker operating mechanism and the interlocked accessory to insure that the circuit breaker contacts remain open until the accessory is completely reset. A tab on the circuit breaker interface lever contacts a surface on the spring-loaded accessory lock-out lever to prevent depression of the associated circuit breaker closing button unless the circuit breaker contacts are in the open condition and the accessory has been reset.

DESCRIPTION OF THE PREFERRED EMBODIMENT

Figure 1:
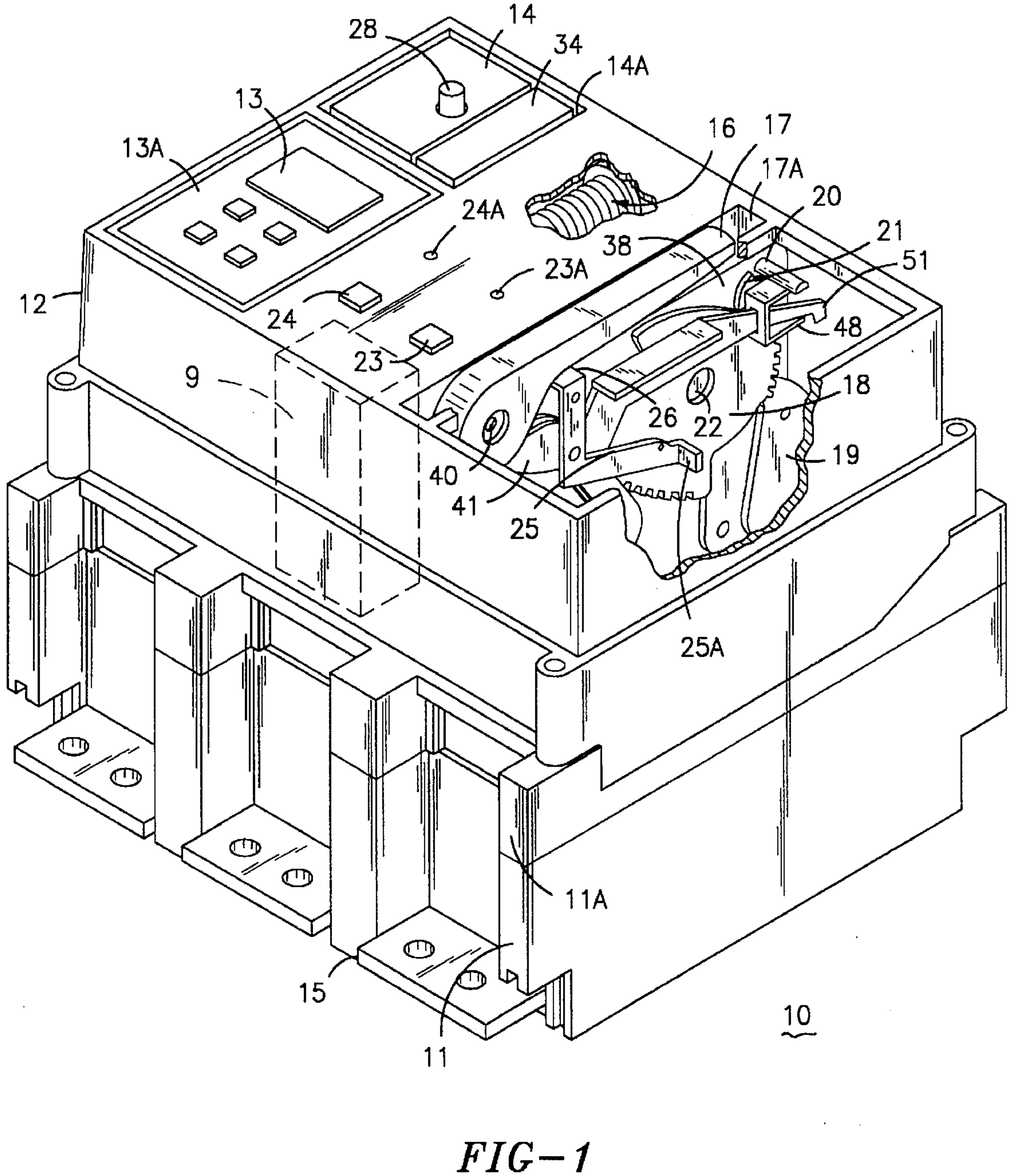
FIG. 1 is a top perspective view of a high ampere rated circuit breaker employing the circuit breaker lock-out mechanism according to the invention.

The high ampere-rated circuit breaker 10 shown in FIG. 1 is described in U.S. Pat. No. 5,424,701 entitled "Operating Mechanism for High Ampere-rated Circuit Breakers" and is capable of transferring several thousand amperes quiescent circuit current at several hundred volts potential without overheating. The circuit breaker consists of an electrically insulated base 11 to which an intermediate cover 11A of similar insulative material is attached prior to attaching the top cover 12, also consisting of an electrically-insulative material. The operating mechanism 9 as described within the aforementioned U.S. Pat. No. 5,424,701 controls the condition of the circuit breaker contacts. Electrical connection with the interior current-carrying components is made by load terminal straps 15 extending from one end of the base and line terminal straps (not shown) extending from the opposite end thereof. The interior components are controlled by an electronic trip unit 13 contained within a recess 13A on the top surface of the top cover 12. The trip unit 13 is similar to that described within the aforementioned U.S. Pat. No. 4,672,501 filed Jun. 9, 1994 and interacts further with the bell alarm and lockout accessory 14 and the undervoltage release accessory 34 contained within the accessory recess 14A. The reset button 28 extending from the top of the bell alarm and lock-out accessory serves to provide reset function to the accessory as well as indication as to whether the circuit breaker operating mechanism is operative. OPEN and CLOSE buttons 23, 24 and OPEN and CLOSE indicators 23A, 24A accessible from the top cover allow manual operation of the circuit breaker operating mechanism to separate the circuit breaker contacts. An operating handle 17 within the handle recess 17A allows the circuit breaker operating mechanism to be manually reset after automatic separation of the circuit breaker contacts. The reset button 28 on the top surface of the bell alarm and lock-out accessory 14 allows the accessory to be reset as will be described below.

Figure 2:
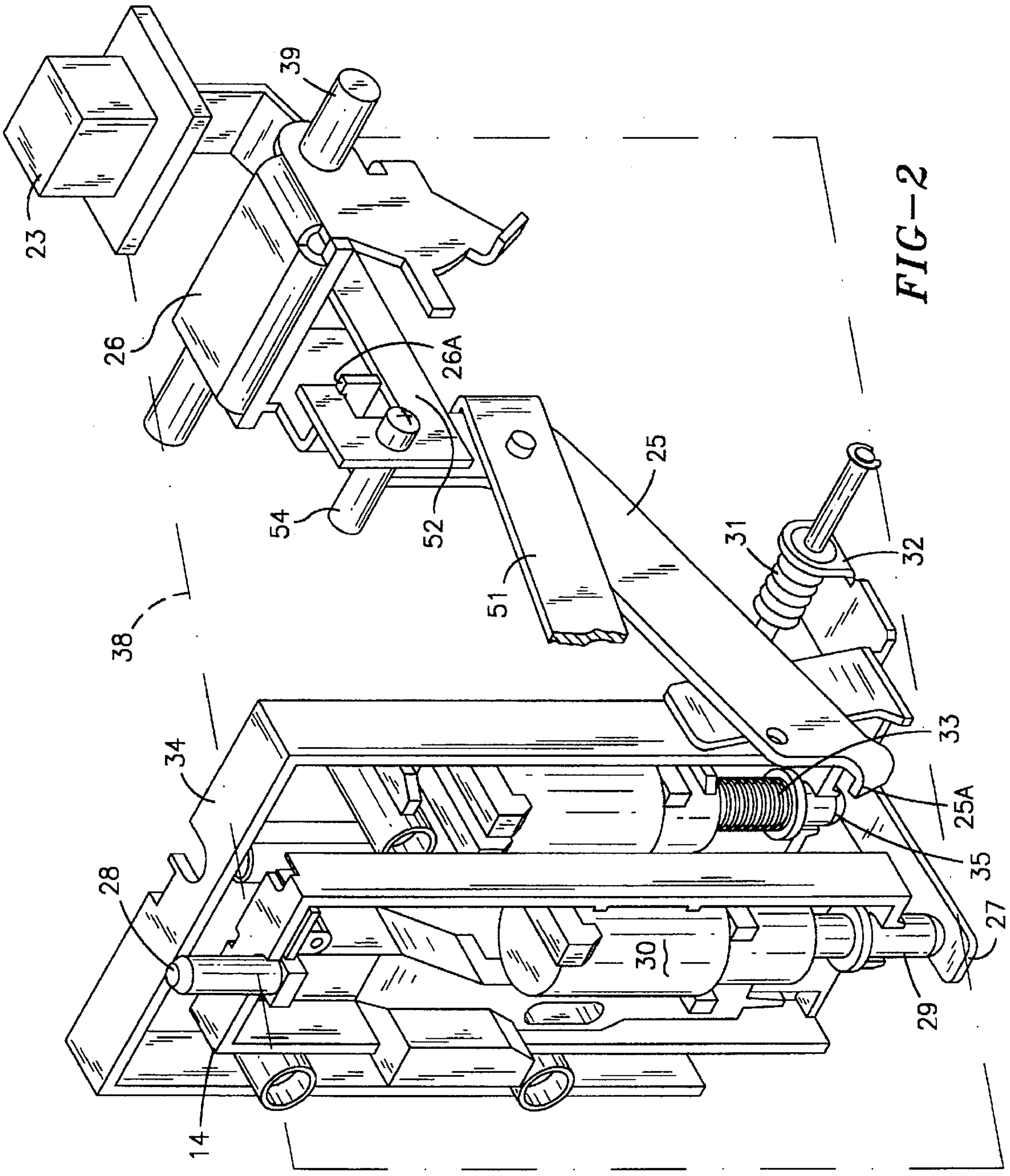
FIG. 2 is an enlarged top perspective view of the accessories and lock-out mechanism within the circuit breaker of FIG. 1.

In the operating mechanism as described within the U.S. Pat. No. 5,486,667 entitled "Rating Module Unit for High Ampere-rated Circuit Breaker" the operating handle 17 allows manual operation of the circuit breaker operating mechanism 9 as well as providing manual means for charging the operating mechanism springs 16. The handle 17 is attached to the operating mechanism sideframe 38 by means of the handle pivot pin 40 and is connected with the handle drive gear 18 by a pair of handle drive links 41. The handle drive gear includes a series of handle drive teeth IBA that interact with a locking pawl 19 to restrain the handle drive gear from reverse rotation during the operating springs charging process as described in the aforementioned U.S. Pat. No. 5,489,755 entitled "Handle Operator Assembly for High Ampere-rated Circuit Breaker" and with a two stage operating springs latching assembly consisting of the primary latch 20 and intermediate latch 21 to prevent rotation of the closing shaft 22 while the operating springs are being charged. The circuit breaker lock-out mechanism that prevents the circuit breaker operating springs 16 from being engaged in the CLOSE position until the bell alarm and lock-out accessory 14 has been reset by means of the reset button 28 includes the interlock lever 25 that interacts with the CLOSE button 23 by means of the U-shaped piece 26 at one end and by means of the tab 25A that interacts with the bell alarm and lockout accessory 14, trip lever 51 and latch 48 at the other end as best seen by referring now to FIG. 2. The interlock lever 25 is viewed from the inside of the circuit breaker 10 of FIG. 1 to detail the U-shaped piece 26 that interacts with the CLOSE button 23 of FIG. 1 by a button lever 52 that rotates about the pivot pin 54. The tab 26 A rotates the interlock lever 25 and the trip lever 51 about the pivot 39. The interlock lever 25 attaches to the operating mechanism sidewall 38, shown in phantom, by means of the pivot pin 39. The bell alarm and lock-out accessory 14 and undervoltage release accessory 34 are shown relative to the interlock lever 25 to depict the accessory interlock function via the accessory lever 27. The position of the accessory lever is determined by the torsion spring 31 arranged on the spring support 32, as indicated.

The bell alarm and lock-out accessory 14 is depicted with the reset button 28 extending from the top thereof and with the plunger 29 extending from the bottom. As described within the aforementioned U.S. patent application Ser. No. 08/248,910 entitled "Bell Alarm and Lock-out for High Ampere-rated Circuit Breakers", the position of the plunger 29 is set by the flux shifter 30 which responds to signals from the trip unit 13 (FIG. 1) to provide remote indication of the occurrence of a circuit interruption. The undervoltage release accessory 34 is similar to that described in U.S. Pat. No. 4,301,434 entitled "Undervoltage Release Reset and Lock-out Apparatus" wherein a plunger 35 is withheld from extending by the solenoid 33 as long as the voltage applied to the solenoid is above a predetermined minimum value.

Figure 4:
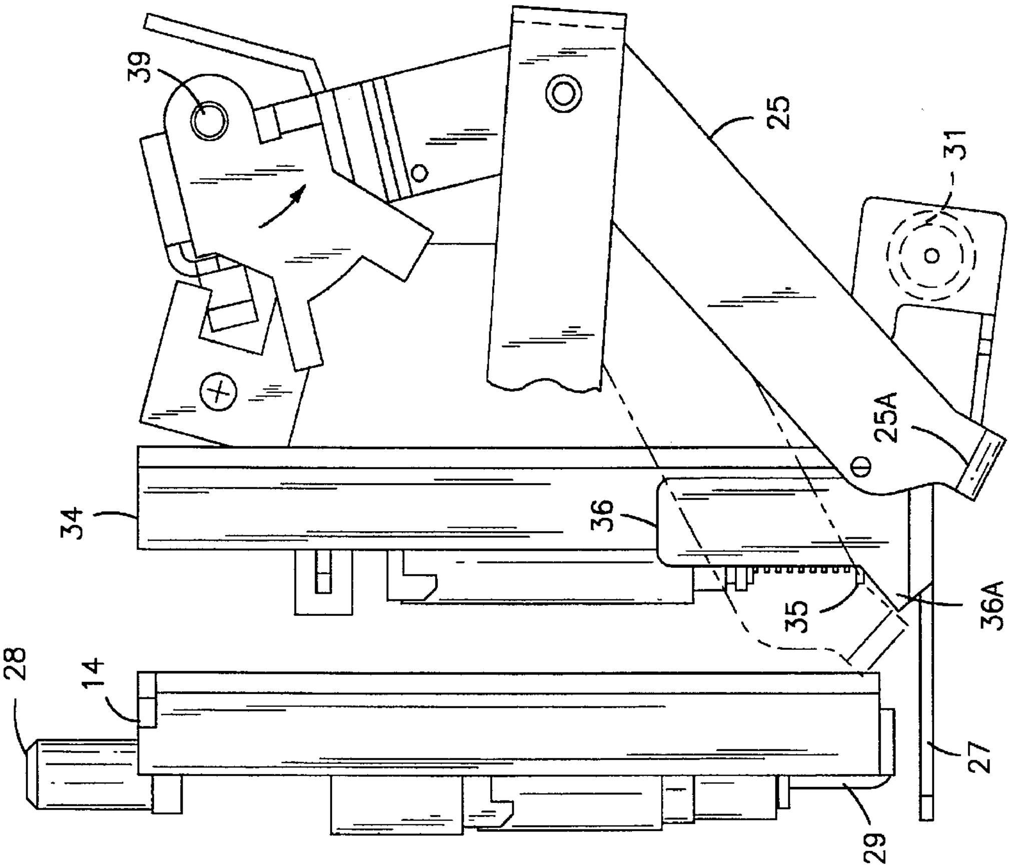
FIG. 4 is a planar side view of the lock-out mechanism of FIG. 2 in a non-interlocked condition.
Figure 3:
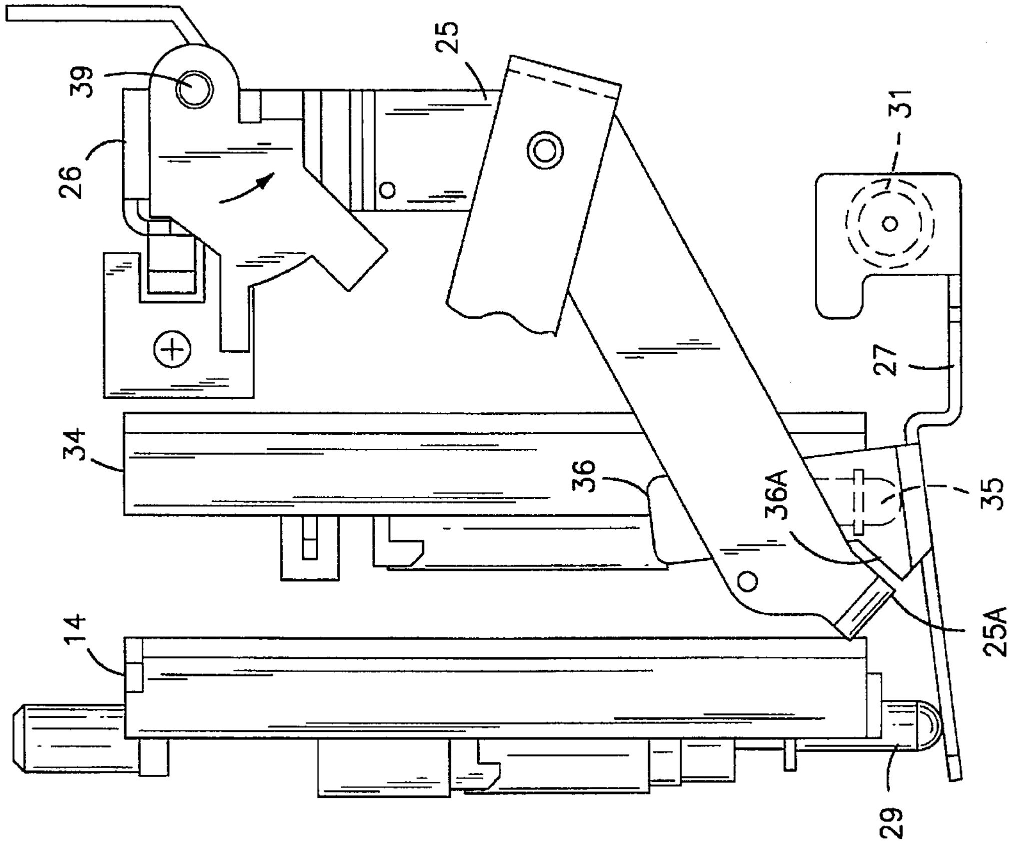
FIG. 3 is a planar side view of the lock-out mechanism of FIG. 2 in an interlocked condition.

FIG. 3 depicts the lock-out condition of the operating mechanism wherein the plunger 29 from the bell alarm and lock-out accessory 14 and the plunger 35 from the undervoltage release unit 34 contact and drive the accessory lever 27 downwards against the return bias of the torsion springs 31 which positions the tab 25A in line with the surface 36A on the side arm 36 of the accessory lever 27. This prevents the interlock lever 25 from rotating about the pivot 39 when the CLOSE button 23 of FIG. 1 is depressed. As described earlier, the CLOSE button interacts with the interlock lever by means of the U-shaped piece 26 to otherwise cause the rotation of the inter lock lever when the CLOSE button is depressed. FIG. 4 depicts the unlocked-out or "free" condition wherein the plunger 29 from the bell alarm and lock-out accessory 14 and the plunger 35 from the undervoltage release unit 34 are away from the accessory lever 27. The reset button 28 on the bell alarm and lock-out accessory has been depressed to withdraw the plunger 29 and the proper voltage has been applied to the solenoid 33 in the undervoltage release unit. The accessory lever is returned to the home position by the return bias of the torsion spring 31, the tab 25A is now out of line with the surface 36A on the side arm 36 of the accessory lever 27. This allows the interlock lever 25 to rotate about the pivot 39 from the interlocked position shown in phantom when the CLOSE button 23 of FIG. 1 is depressed, the circuit breaker lock-out mechanism has herein been described that interfaces between the circuit breaker operating mechanism and the circuit breaker accessory to prevent the operating mechanism from responding to close the circuit breaker contacts until and unless the accessories are reset.

We claim:

1. An industrial-rated circuit breaker for high level overcurrent protection comprising:

an insulative base and an insulative cover;

an operating mechanism in said base controlled by an electronic trip unit arranged within said cover, said operating mechanism including operating springs to open and close a pair of contacts; and an accessory unit arranged within said cover, said accessory unit including reset means to allow manual reset of said accessory unit after said accessory unit has become actuated and interlock means within said cover interacting with said operating mechanism and said accessory unit allowing said operating mechanism to charge said operating springs while preventing said operating mechanism from closing said contacts until said accessory unit is reset, said interlock means includes an interlock lever, an accessory lever subjacent said accessory unit, a sidearm upstanding from said accessory lever and an interlock lever tab interacting with a surface on said accessory lever sidearm.

2. The industrial-rated circuit breaker of claim 1 including a spring biasing said accessory lever to a reset position.

3. The industrial-rated circuit breaker of claim 1 including a U-shaped piece extending from an end of said interlock lever opposite from said interlock tab.

4. The industrial-rated circuit breaker of claim 1 wherein said accessory unit includes a plunger contacting said accessory lever when said operating unit has responded to said trip unit to interrupt electric current through a protected circuit.

5. The industrial-rated circuit breaker of claim 1 wherein said U-shaped piece includes a tab interacting with a closing button to charge said circuit breaker operating mechanism.

6. The industrial-rated circuit breaker of claim 1 wherein said accessory unit comprises a bell alarm.

7. The industrial-rated circuit breaker of claim 1 wherein said accessory unit comprises an undervoltage release.

* * * * *